Nov. 3, 1959     J. CUCURO     2,910,797

FISHING POLE ATTACHMENT

Filed Aug. 8, 1957

INVENTOR.
JAMES CUCURO
BY
Donnelly, Mentag & Harrington
ATTORNEYS

2,910,797

FISHING POLE ATTACHMENT

James Cucuro, Detroit, Mich.

Application August 8, 1957, Serial No. 677,043

9 Claims. (Cl. 43—17)

This invention relates to a new and useful improvement in a fishing pole attachment adapted to indicate a flexing of the fishing pole beyond a predetermined degree. The purpose of the attachment is to indicate to the fisherman when he has a nibble or has hooked a fish.

It is an object of the present invention to provide an attachment of this class which will be simple in construction, compact, light, durable and highly efficient in use.

Another object of the invention is the provision of an adjusting mechanism on the attachment so that the same may be adjusted to function at various degrees of flexing of the fishing pole.

Another object of the invention is the provision in an attachment of this class of a mechanism whereby a flexible spring may be adjusted to various lengths to flex the body.

Other objects will appear hereinafter.

It is recognized that various modifications and changes may be made in the detail of the structure illustrated without departing from the invention, and it is intended that the present disclosure shall be considered to be but the preferred embodiment thereof.

Forming a part of this application are drawings in which.

Figure 1:
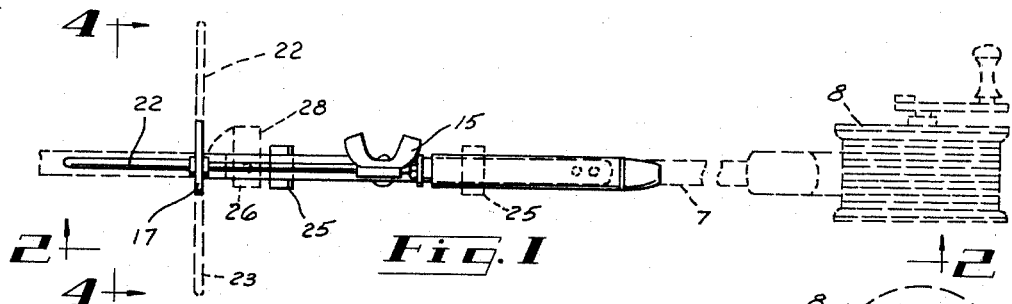
Fig. 1 is a top plan view of the invention.

As shown in the drawings, I use a flash light embodying a housing 9 having the outlet end 10 from which radiates light rays 11. Projecting outwardly from this housing 9 is a metallic rod 12 which contacts one end of the flash light battery contained in the housing 9. The rod 12 is not electrically connected to the housing 9. Secured to this rod 12 is a plate 13 associated with which is a cooperating clamping plate 14. A screw 16 is projected through these plates 13 and 14 which is provided with a wing nut 15 whereby the attachment may be clamped on the fishing rod 7. The flash light housing 9 and outlet end 10 are of the conventional type flash light structure including the usual flash light bulb threadably and electrically mounted therein in the usual manner, and contacting the other end of the battery in the usual manner.

Figure 4:
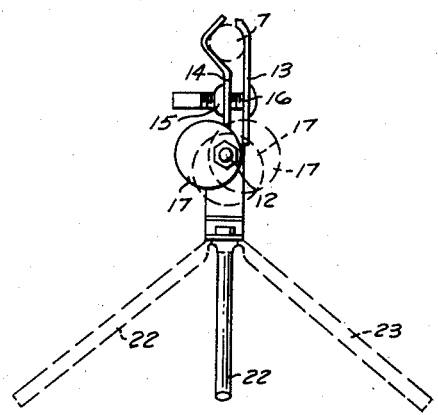
Fig. 4 is a front elevational view of the invention taken on the line 4—4 of Fig. 1.

Rotatably mounted on the rod 12 eccentrically, is a disk 17 held in position by the nuts 18 and 19 threaded on the rod 12. As shown in Fig. 4, this disk 17 may be rotated on the rod 12 to various positions. A leaf spring 21 is connected at one end to the battery housing 9 so as to be connected through the light bulb to the battery within the housing 9 at the end opposite to the end which is engaged by the metallic rod 12.

A yoke comprising supporting legs 22 and 23 is rotatably mounted by means of a bolt 24 to the free end of the spring 21. Slidable on this spring 21 is an adjusting weight 25. On the forward end of the spring 21 there is rotatably mounted by means of a rivet 27 a metallic bar 26 having a curved end 28.

In use, the invention may be placed upon a suitable supporting surface such as a dock, retaining wall, bank, boat and so forth. It will be noted that the housing 9 and the rod 12 are mounted to extend parallel to the fishing rod 7. In normal use, the disk 17 will be spaced from the spring 21 and this degree of spacing may be determined by rotating the eccentrically mounted disk 17 on its mounting. The member 26 may also be swung forwardly from the position shown in Fig. 2 so that the member 26 overlies the forward end of the leaf spring 21. By having the curved end 28 extending upwardly the distance of spacing from the disk 17 is again lessened.

When fishing for very small fish, it is desirable that the spacing be reduced to a minimum so that upon a very slight flexing of the fishing rod the disk 17 will contact either the member 28 or the spring 21 and close the circuit to the battery. In this way, the battery light will serve as an indicator to the fisherman that an unusual condition exists, usually resulting from the catching of a fish or from a nibble.

Figure 2:
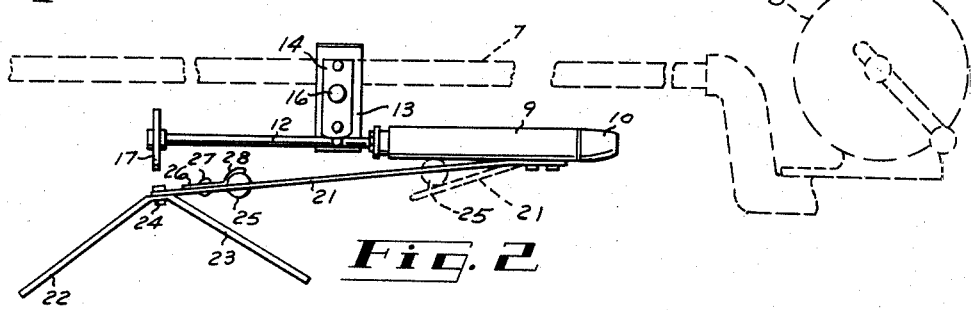
Fig. 2 is a side elevational view of the invention.
Figure 3:
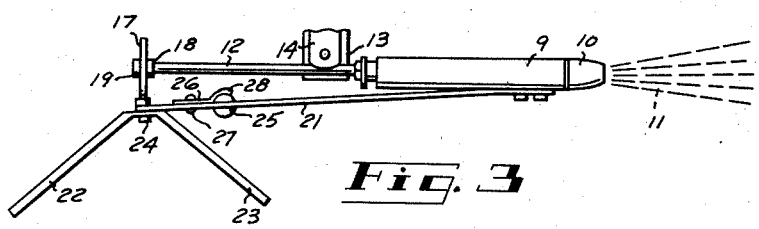
Fig. 3 is a side elevational view of the invention showing the various parts flexed into operative position.

By moving the adjusting weight 25 lengthwise of the member 21 until it underlies the housing 9, as shown in dotted lines in Fig. 2, the length of the flexing portion of the spring 21 is adjusted so that a greater stress would be necessary to bring the metallic disk 17 into circuit closing position relatively to the member 21.

The supporting legs 22 and 23 are mounted rotatably on the spring 21 so that if it is desired to support the fishing rod on the side of a boat, these legs may be rotated so as to straddle the side of the boat.

It will be noted that the rod itself serves to operate the mechanism and that the fishing line does not function to this effect.

What I claim is:

1. A fishing pole attachment comprising: a battery container carrying a battery therein, said container being in contact with one side of said battery through a light bulb electrically connected to said container at one end thereof; a rod projecting outwardly from the other end of said container, and connected to the opposite end of said battery; means for securing said rod to a fishing pole a spring member connected at one end electrically to said container; depending supporting legs on the other end of said spring member for engaging a supporting surface; and a contact member normally spaced from said spring member and relatively movable thereto into contact therewith and mounted on said rod.

2. A fishing pole attachment comprising: a battery container carrying a battery therein, said container being in contact with one side of said battery through a light bulb electrically connected to said container at one end thereof; a rod projecting outwardly from the other end of said container, and connected to the opposite end of said battery; means for securing said rod to a fishing pole a spring member connected at one end electrically to said container; depending supporting legs on the other end of said spring member for engaging a supporting surface; a contact member normally spaced from said spring member and relatively movable thereto into contact therewith and mounted on said rod; and, said contact member being movably mounted on said rod and movable into positions of various spaced relation to said spring member.

3. A fishing pole attachment comprising: a battery container carrying a battery therein, said container being in contact with one side of said battery through a light bulb electrically connected to said container at one end thereof; a rod projecting outwardly from the other end of said container, and connected to the opposite end of said battery; means for securing said rod to a fishing pole a spring member connected at one end electrically to said container; depending supporting legs on the other end of said spring member for engaging a supporting surface; a contact member normally spaced from said spring member and relatively movable thereto into contact therewith and mounted on said rod; said contact member being movably mounted on said rod and movable into positions of various spaced relation to said spring member; and, said supporting legs being rotatable on said spring member to extend longitudinally thereof or transversely thereof.

4. A fishing pole attachment comprising: a battery container carrying a battery therein, said container being in contact with one side of said battery through a light bulb electrically connected to said container at one end thereof; a rod projecting outwardly from the other end of said container, and connected to the opposite end of said battery; means for securing said rod to a fishing pole a spring member connected at one end electrically to said container; depending supporting legs on the other end of said spring member for engaging a supporting surface; a contact member normally spaced from said spring member and relatively movable thereto into contact therewith and mounted on said rod; said contact member being movably mounted on said rod and movable into positions of various spaced relation to said spring member; said supporting legs being rotatable on said spring member to extend longitudinally thereof or transversely thereof; and, a member slidable longitudinally of said spring and movable into a position for engaging said container for shortening the flexing length of said spring.

5. A fishing pole attachment comprising: a battery container carrying a battery therein, said container being in contact with one side of said battery through a light bulb electrically connected to said container at one end thereof; a rod projecting outwardly from the other end of said container, and connected to the opposite end of said battery; means for securing said rod to a fishing pole a spring member connected at one end electrically to said container; depending supporting legs on the other end of said spring member for engaging a supporting surface; a contact member normally spaced from said spring member and relatively movable thereto into contact therewith and mounted on said rod; said contact member being movably mounted on said rod and movable into positions of various spaced relation to said spring member; said supporting legs being rotatable on said spring member to extend longitudinally thereof or transversely thereof; and, a contact member swingably mounted on the free end of said spring and elevated at one end relatively thereto and movable into position in registration with said contact member.

6. A fishing pole attachment comprising: a battery container carrying a battery therein, said container being in contact with one side of said battery through a light bulb electrically connected to said container at one end thereof; a rod projecting outwardly from the other end of said container, and connected to the opposite end of said battery; a spring member connected at one end electrically to said container; depending supporting legs on the other end of said spring member for engaging a supporting surface; a contact member normally spaced from said spring member and relatively movable thereto into contact therewith and mounted on said rod; said contact member being movably mounted on said rod and movable into positions of various spaced relation to said spring member; said supporting legs being rotatable on said spring member to extend longitudinally thereof or transversely thereof; a contact member swingably mounted on the free end of said spring and elevated at one end relatively thereto and movable into position in registration with said contact member; and means for securing said rod to a fishing pole.

7. A fishing pole attachment of the class described, comprising: a metallic container for reception of a battery, one end of the battery therein being electrically connected to said container through a light bulb mounted on said container in electrical connection therewith; a spring member connected at one end electrically to one end of said container and extending longitudinally thereof and projecting beyond the opposite end; depending supporting legs on the other end of said spring member for engaging a supporting surface; a rod projecting from the opposite end of said container and removably connected to the opposite end of said battery; means for securing said rod to a fishing pole and a contact member eccentrically mounted on the other end of said rod and overlying the free end of said spring and normally in spaced relation thereto and rotatable to various positions for varying the distance of spacing.

8. A fishing pole attachment of the class described, comprising: a metallic container for reception of a battery, one end of the battery therein being electrically connected to said container through a light bulb mounted on said container in electrical connection therewith; a spring member connected at one end electrically to one end of said container and extending longitudinally thereof and projecting beyond the opposite end; depending supporting legs on the other end of said spring member for engaging a supporting surface; a rod projecting from the opposite end of said container and removably connected to the opposite end of said battery; means for securing said rod to a fishing pole a contact member eccentrically mounted on the other end of said rod and overlying the free end of said spring and normally in spaced relation thereto and rotatable to various positions for varying the distance of spacing; a metallic member swingably mounted on said spring member adjacent its free end and having one end elevated from said spring member and swingable to a position on said elevated end beneath said contact member for engagement therewith upon flexing of said spring.

9. A fishing pole attachment of the class described, comprising: a metallic container for reception of a battery, one end of the battery therein being electrically connected to said container through a light bulb mounted on said container in electrical connection therewith; a spring member connected at one end electrically to one end of said container and extending longitudinally thereof and projecting beyond the opposite end; a rod projecting from the opposite end of said container and removably connected to the opposite end of said battery; means for securing said rod to a fishing pole a contact member eccentrically mounted on the other end of said rod and overlying the free end of said spring and normally in spaced relation thereto and rotatable to various positions for varying the distance of spacing; a metallic member swingably mounted on said spring member adjacent its free end and having one end elevated from said spring member and swingable to a position on said elevated end beneath said contact member for engagement therewith upon flexing of said spring; and a pair of legs swingably mounted on the free end of said spring and swingable into position to extend transversely of said spring or longitudinally thereof.

References Cited in the file of this patent
UNITED STATES PATENTS

| | | |
|---|---|---|
| 2,538,788 | Massino | Jan. 23, 1951 |
| 2,567,777 | Massino | Sept. 11, 1951 |
| 2,698,725 | Triplett | Jan. 4, 1955 |